US011200188B1

(12) United States Patent
Chen et al.

(10) Patent No.: US 11,200,188 B1
(45) Date of Patent: Dec. 14, 2021

(54) OPERATING SYSTEM AGNOSTIC WIRELESS MULTIMEDIA DONGLE (71) Applicant: Logitech Europe S.A., Lausanne (CH)

(72) Inventors: Shelly Chen, Shanghai (CN); Yuzheng Lu, Shanghai (CN); Wayne Zhang, Shanghai (CN)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/926,332

(22) Filed: Jul. 10, 2020

(51) Int. Cl.
*H04B 1/38* (2015.01)
*G06F 13/42* (2006.01)
*G06F 13/40* (2006.01)

(52) U.S. Cl.
CPC ...... *G06F 13/4068* (2013.01); *G06F 13/4282* (2013.01); *H04B 1/38* (2013.01); *G06F 2213/0042* (2013.01)

(58) Field of Classification Search
CPC ............................. G06F 13/4282; H04B 1/38
See application file for complete search history.

(56) References Cited

U.S. PATENT DOCUMENTS

| | | |
|---|---|---|
| 2006/0182427 A1 | 8/2006 | Chen et al. |
| 2007/0073935 A1 | 3/2007 | Kim et al. |
| 2008/0182518 A1 | 7/2008 | Lo |
| 2008/0250180 A1 | 10/2008 | Chang et al. |
| 2010/0057972 A1 | 3/2010 | Stangl et al. |
| 2011/0093634 A1 | 4/2011 | Minami |
| 2012/0011285 A1 | 1/2012 | Matton et al. |
| 2013/0010848 A1* | 1/2013 | Shimizu .................. H04L 5/06 375/219 |
| 2013/0138860 A1 | 5/2013 | Moore |
| 2017/0366710 A1 | 12/2017 | Vaughn et al. |
| 2019/0182529 A1* | 6/2019 | Zhao .................. H04N 21/4184 |

* cited by examiner

*Primary Examiner* — Zachary K Huson
(74) *Attorney, Agent, or Firm* — Kilpatrick Townsend & Stockton LLP (57) ABSTRACT Disclosed are techniques pertaining to wireless dongles that can wirelessly transfer multimedia data (e.g., video and/or audio) between two computer devices. The computer devices can include a source (e.g., a laptop or tablet computer) and a sink (e.g., a television set or projector). The techniques improve the usability and flexibility of such dongles, allowing them to operate with a wide variety of devices.

20 Claims, 5 Drawing Sheets

Wireless video dongle connected to host computer device via an electrical connector. —402

Wireless video dongle presents itself as multiple device classes over a communications bus accessed via the electrical connector. —404

Software for using the wirelss video dongle is optionally downloaded from memory stored on the wirelss video dongle. —406

Software on the host computer device transmits multimedia data to the wireless video dongle using a selected one of the multiple device classes. —408

OPERATING SYSTEM AGNOSTIC WIRELESS MULTIMEDIA DONGLE

BACKGROUND

Dongles are devices that can be coupled to a host device to provide additional functionality to the host device. Some dongles can, for example, be attached to a universal serial bus (USB) port of a computer device. Disclosed are techniques to improve the state of the art with regard to dongles, including techniques to wirelessly transfer multimedia data between two dongles. The dongles can be used to wirelessly transfer multimedia data from a source computer device to a sink computer device to, for example, stream and display, on the sink device, a video or presentation from the source device.

BRIEF SUMMARY

Disclosed are techniques pertaining to wireless multimedia dongles and related systems. A wireless multimedia dongle system can include a host computer device having a Universal Serial Bus (USB) electrical port, and one or more host processors coupled to the USB electrical port. The wireless multimedia dongle system can also include a wireless multimedia dongle having a housing; a USB electrical connector coupled to the housing; a memory coupled to the housing; a wireless transceiver coupled to the housing; and one or more dongle processors coupled to the wireless transceiver, the housing, and the memory.

The one or more dongle processors can be configured to operate the wireless multimedia dongle as a transmitter, wherein, while in the transmitter mode, the wireless multimedia dongle is configured to transmit, via the wireless transceiver, transmitter video data input via the USB electrical connector from the host computer device. The one or more dongle processors can be configured to operate the wireless multimedia dongle as a receiver, wherein, while in the receiver mode, the wireless multimedia dongle is configured to receive, via the wireless transceiver, receiver video data from a like wireless multimedia dongle and output the video data via the USB electrical connector to the host computer device.

The one or more dongle processors can also be configured to detect that the USB electrical connector has been attached to the USB electrical port of the host computer device and, in response, present the wireless multimedia dongle as a plurality of USB-compliant device classes, including an ethernet device class and a human interface device (HID) class, wherein each of the ethernet device class and the HID device is capable of receiving the transmitter video data for wireless transmission. The one or more dongle processors can additionally be configured to receive the transmitter video data via the USB electrical connector as ethernet-encoded data, via the ethernet device class, from the host computer. The one or more host processors can be configured to output the transmitter video data via the USB electrical port as ethernet-encoded data.

The one or more dongle processors can further be configured to output the receiver video data via the USB electrical connector as ethernet-encoded data from the host computer. The one or more host processors can be configured to output the transmitter video data via the USB electrical port as ethernet-encoded data. The one or more processors can also be configured to output an indicium shared with a paired like wireless multimedia dongle.

The techniques can include a computer dongle comprising a housing; an electrical connector coupled to the housing; a function-specific circuit coupled to the housing; and one or more processors coupled to the function-specific circuit and the housing. The one or more processors can be configured to receive data, from a host computer device via the electrical connector, in any one of a plurality of formats, including an ethernet-encoded format and a non-ethernet-encoded format, wherein the format is based on an operating system (OS) running on the host computer device. The one or more processors can also be configured to pass the data to the function-specific circuit wherein the data is used by the function-specific circuit to enable a function for the host computer device provided by the computer dongle and to provide the same function to the host computer device in response to receiving the data encoded in either the ethernet format or the non-ethernet format.

The one or more processors can further be configured to de-encapsulate the ethernet-encoded data prior to passing the data to the function-specific circuit. The one or more processors can also be configured to present the computer dongle to the host computer as a plurality of device classes wherein the data is received by the computer dongle in the ethernet-encoded format or the non-ethernet-encoded format via a respective different one of the plurality of device classes. The one or more processors can additionally be configured to receive tertiary data via the electrical connector via a tertiary one of the plurality of device classes. The tertiary data can be used to enable the function for the host computer device. The ethernet-encoded data can include video data, and the function can be to wirelessly transmit or receive the video data with a like computer dongle.

The computer dongle can further include a non-transitory memory storing instructions. The memory can be accessible by the host computer device via the electrical connector and via an additional one of the plurality of device classes. The instructions, when read by the host computer, can configure the host computer to access the function of the dongle. The function-specific circuit can include a wireless transceiver. The function-specific circuit can include fixed-function hardware configured to encode or decode video data.

The disclosed techniques can include a method of operating a computer dongle. The method can include receiving data, at the computer dongle via an electrical connector coupled to the computer dongle, from a host computer device, in any one of a plurality of formats, including an ethernet-encoded format and a non-ethernet-encoded format. The format can be based on an operating system running on the host computer device. The method can further include passing the data to a function-specific circuit of the computer dongle wherein the data can be used by the function-specific circuit to enable a function for the host computer device provided by the computer dongle. The same function can be provided to the host computer device in response to receiving the data encoded in either the ethernet format or the non-ethernet format.

The method can further include de-encapsulating the ethernet-encoded data prior to passing the data to the function-specific circuit. The method can also include presenting the computer dongle to the host computer as a plurality of device classes wherein the data is received by the computer dongle in the ethernet-encoded format or the non-ethernet-encoded format via a respective different one of the plurality of device classes. The method may further include receiving tertiary data via the electrical connector via a tertiary one of the plurality of device classes. The tertiary data can be used to enable the function for the host computer device.

The ethernet-encoded data can include video data, and the function can be to wirelessly transmit or receive the video data with a like computer dongle. The method can include transmitting, via the electrical connector and via an additional one of the plurality of device classes, from non-transitory memory of the computer dongle, instructions to the host computer device via the electrical connector and via an additional one of the plurality of device classes. The instructions, when read by the host computer, can configure the host computer to access the function of the dongle. The function-specific circuit can include a wireless transceiver. The function-specific circuit can include fixed-function hardware configured to encode or decode video data. The method can also include detecting that the data received via the electrical connector is in a raw format and, in response, encoding the data prior to wireless transmission via the wireless transceiver.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The detailed description is set forth with reference to the accompanying figures.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Disclosed are techniques pertaining to an improved wireless multimedia dongle. A dongle is a device that can be coupled to a host computer device to provide increased functionality to the host computer device. For example, a dongle can include memory accessible to the host computer device, increase a number of interface ports to the host device, or provide enhanced interface functionality beyond what the host device is capable of in isolation, etc.

The disclosed wireless multimedia dongles can provide enhanced functionality to host computer devices in the form of enabling a source computer device to wirelessly display information on a sink computer device. For example, two dongles can be used, a first one coupled to the source computer device (e.g., laptop computer, tablet computer, desktop computer, smartphone, etc.) and the second one coupled to the sink computer device (e.g., a computer monitor, projector, television, head-mounted display, etc.).

The first dongle can, when coupled to the source computer device, receive multimedia data (e.g., video, image, and/or audio data) and wirelessly transmit the data for the second dongle to receive it. The second dongle can, respectively, when coupled to the sink computer device, receive the wireless transmission from the first dongle and provide the multimedia data to the sink device for output by the sink device.

Certain embodiments can include features to improve cross-platform compatibility of the wireless multimedia dongles and general ease of use of the dongles. For example, a singular design can be used for the dongle that supports respective operation of the dongle in a transmission or receiving mode. As another example, a dongle can include features that enable multiple or different interface(s) to a host computer device to account for differences in operating system (OS) functionality/permissions, as will be disclosed in further detail herein. In certain embodiments, power-savings techniques can enable wireless multimedia dongles to operate without an external power adapter.

Figure 1:
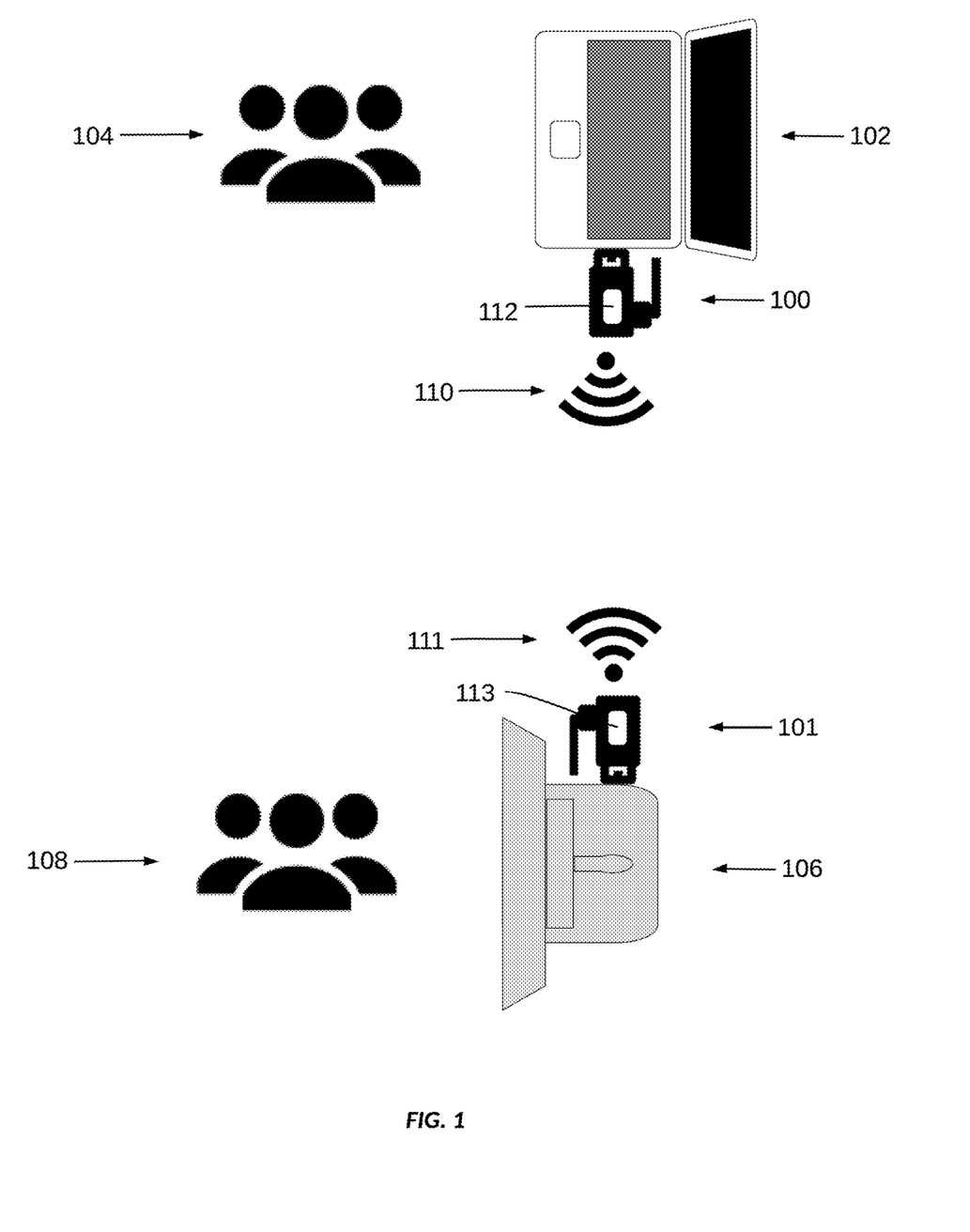
FIG. 1 shows a notional wireless multimedia dongle system according to certain techniques of the disclosure.

FIG. 1 illustrates an example wireless multimedia dongle system according to certain aspects of the disclosure. Illustrated are host computer devices for respective wireless multimedia dongles 100 and 101. The device coupled to wireless multimedia dongle 100 can be a source computer device 102 that provides multimedia data for presentation on sink computer device 106. As illustrated, source computer device 102 can be a laptop computer. Source computer device 102 can alternatively be a desktop computer, tablet computer, smartphone, digital camera, smartwatch, or any other device capable of providing multimedia data to wireless multimedia dongle 112. Sink computer device 106 can be a computer monitor, projector, television set, or other display device capable of displaying multimedia information. Sink computer device 106 may be a desktop or similar computer system as described as examples for source computer device 102.

In operation, user(s) 104 of source computer device 102 can couple wireless multimedia dongle 100 to source computer device 102. For example, wireless multimedia dongle 100 can include a physical connector such as a USB or other connector that can be plugged into a respective port of source computer device 102. Wireless multimedia dongle 100 may then receive power from source computer device 102 through their mutual connection. A respective wireless multimedia dongle 101 can be coupled to sink computer device 106 via a similar interface as used between wireless multimedia dongle 100 and source computer device 102.

While wireless multimedia dongle 100 is coupled with source computer device 102 and wireless multimedia dongle 101 is coupled with sink computer device 106, multimedia data can be sent or streamed from source computer device 102 for presentation to user(s) 108 on sink computer device 106. Thus, user(s) 104 may select one or more multimedia presentations (e.g., a slideshow, video, multimedia presentation, etc.) via source computer device 102 and display the one or more multimedia presentations via sink computer device 106.

The multimedia data can be streamed as wireless signals 110 from wireless multimedia dongle 100 to wireless multimedia dongle 101. Wireless information 111 can also be sent from wireless dongle 101 to wireless dongle 100 to provide capability or performance information. For example, multimedia capabilities of sink computer device 106 can be communicated from wireless dongle 101 to wireless dongle 100. The multimedia capabilities supported by the sink computer device 106 can include one or more of the following: video resolution(s), video framerate(s), video or audio format(s)/codec(s), brightness, contrast, ambient light, control capabilities (e.g., whether sink computer device 106 can accept control commands via the interface with wireless multimedia dongle 101), speaker configuration(s) (e.g., 2.1, 5.2, etc.), etc. The information communicated from wireless multimedia dongle 101 may also pertain to signal integrity between wireless multimedia dongles 100 and 101 so that, for example, multimedia data streamed between the devices can be adjusted (in real time or periodically) to prevent the amount of data being transmitted from exceeding the available bandwidth between the two.

As disclosed herein, wireless multimedia dongle 100 and wireless multimedia dongle 101 can be manufactured with the same feature set (e.g., each one can be used respectively in a transmitter or receiver configuration). In certain embodiments, wireless multimedia dongle 100 and/or wireless multimedia dongle 101 can be powered on in a first receiving mode. In response to actuation of an input element 112 or 113 (e.g., a physical button or switch), the operational mode of the wireless multimedia dongle may be changed from a receiving mode to a transmitting mode. For example, after wireless multimedia dongle 100 is coupled with source computer device 102 and is thus powered, input element 112 may be actuated by user(s) 104 to change the operational mode. A wireless address, frequency, or transmission pattern may be hardcoded into wireless dongles 100 and 101 at factory and/or modified or selected using software running on a host computer device. Thus, wireless multimedia dongle 100 when operating in a transmitted mode may be able to communicate with wireless multimedia dongle 101.

In certain embodiments, a wireless multimedia dongle configured in a receiving mode, such as wireless multimedia dongle 101, can transmit multimedia data to a host computer device alternatively in a compressed or raw format. For example, wireless multimedia dongle 101 may interrogate or otherwise communicate with sink computer device 106 to determine whether it is capable of receiving a compressed or raw format, or, otherwise, to determine which compressed formats sink computer device 106 is capable of receiving. In response, wireless multimedia dongle 101 may determine whether to decompress multimedia data received wirelessly from wireless multimedia dongle 100. Wireless multimedia dongle 101 can alternatively re-encode multimedia data to a different format. The decompressing, unencoding, and re-encoding can be performed using fixed-function hardware of wireless multimedia dongle 101 as disclosed herein.

A host computer device, such as source computer device 102, may include software to enable functionality and/or expose features of a corresponding wireless multimedia dongle. These features and functionality can include selecting which multimedia presentation(s) are to be transmitted via dongle, selecting specification(s) for streaming of multimedia presentations (brightness, volume, resolution, etc.), and certain features to enable wireless multimedia dongles to operate with a variety of computer systems and operating systems. For example, as disclosed herein, a physical connector between a wireless multimedia dongle and a host computer device may be a standardized interface, such as USB, that is ubiquitous across multiple computer form factors and platforms. Certain operating systems may treat USB functionality differently. For example, a USB dongle device can be presented to a host computer device as one of (or a multiple of) device class types, each with corresponding capabilities and specified interfaces. Some operating systems may limit use of some design classes for security or other reasons. For example, iOS limits functionality of some device classes. Certain aspects of the disclosure pertain to selecting an appropriate class type depending on the operating system of the host computer device to which a wireless multimedia dongle is coupled.

USB device classes include Human Interface Devices (HIDs), mass storage, and communications device class (CDC) with a further subcategory of Network Control Model (NCM) for ethernet-over-USB functionality. In certain embodiments, a wireless multimedia dongle (such as wireless multimedia dongle 100) may present itself to a host computer device as a plurality of device classes that may be accessible by the host computer device over a common physical connection. Depending on the operating system (or other aspects of the host computer device), one or more of the device classes may alternatively be used and/or the use modified by software on the host computer device.

As an example, the USB HID class may be a preferable device class for transferring multimedia data via a wireless multimedia dongle for many operating systems (e.g., Windows, OSX, Unix, etc.). However, such a device class may not be accessible or may be locked on host computers using the iOS operating system. Thus, software running on the host computer device running the iOS operating system may instead utilize the USB CDC device class to transfer the multimedia data. The CDC device class is typically used to transfer communications data (such as network-encoded or encapsulated data). The wireless multimedia dongle may accept the multimedia data via either device class and route the multimedia data for wireless transmission regardless of which data class is used. Thus, a common wireless multimedia dongle can be used on multiple host computer devices.

One effect of using a USB device as a CDC device is that many host computer devices may only support one active network/communications device at a time. Thus, the use of the wireless multimedia dongle as a CDC device may prevent a host computer device from simultaneously using a built-in Wi-Fi card, for example. However, multimedia data may not be streamed via a wireless dongle otherwise.

In certain embodiments, a wireless multimedia dongle may present itself to a host computer device as a mass storage device. The mass storage device can enable static memory to be accessible by a host computer device. The mass storage device can include software to be loaded onto the host computer device to enable the host computer device to use the wireless multimedia streaming functionality of the wireless multimedia dongle. In certain embodiments, the mass storage functionality may be used to stream multimedia data. The mass storage functionality generally does not support streaming multimedia data; however, multimedia data may be written to memory within the wireless multimedia dongle in successive portions that may then be transferred wirelessly via a dongle.

Figure 2:
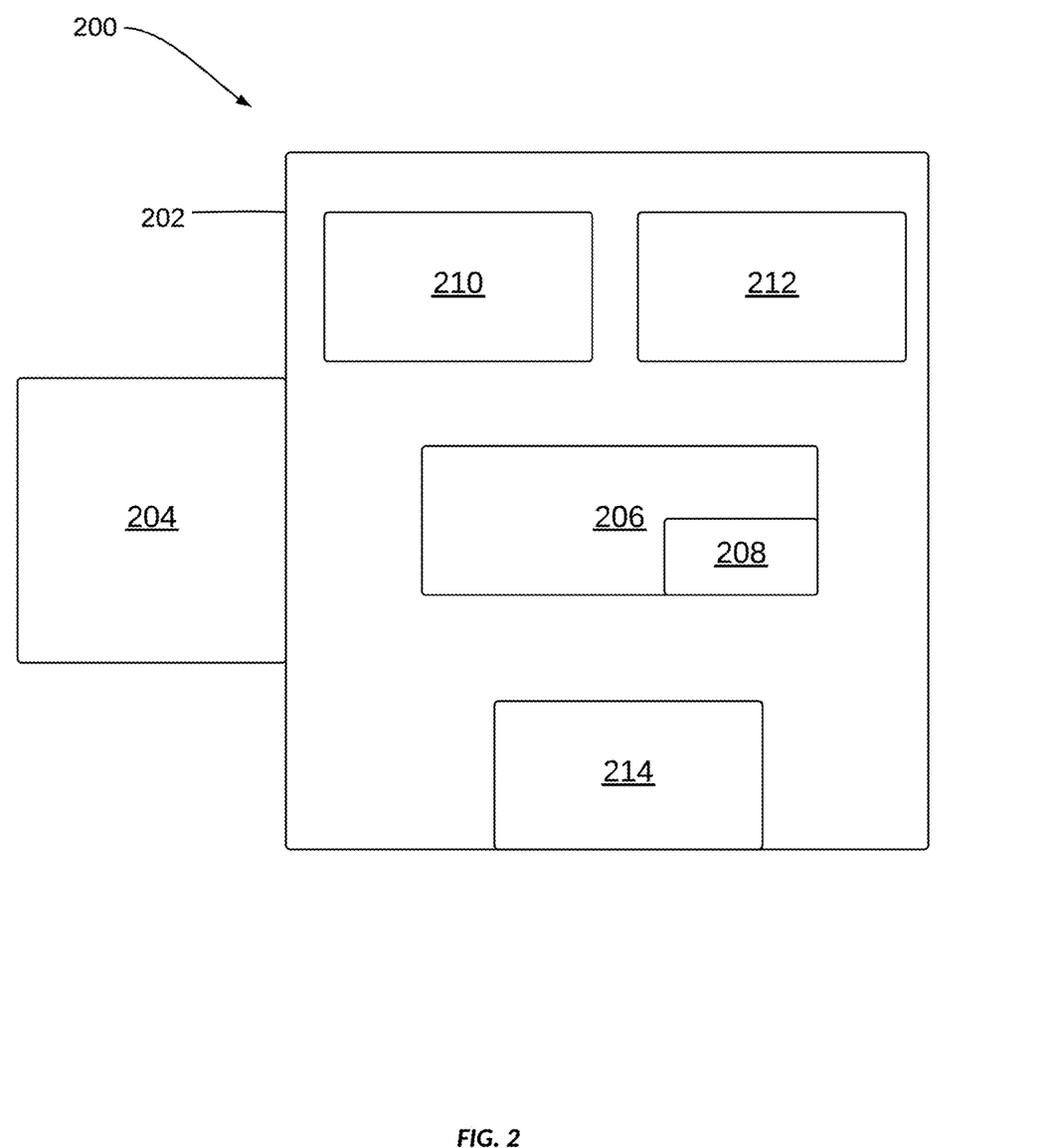
FIG. 2 shows an example wireless multimedia dongle that can be used in the system of FIG. 1.

FIG. 2 illustrates a notional wireless multimedia dongle 200 which may be similar to wireless multimedia dongle 100 or 101. Wireless multimedia dongle 200 includes a housing 202 and an electrical connector 204. Electrical connector 204 can be a USB-compliant connector (e.g., USB type-A or -C) and may include data and/or power lines. As illustrated in FIG. 1, electrical connector 204 can be attached to a respective host computer device (such as devices 102 or 106) to transmit data and/or power therebetween. Electrical connector 204 may alternatively be, for example, a firewire, external serial advanced technology attachment, high-definition multimedia interface, display port, or similar connector with processor(s) 206 of wireless multimedia dongle 200 supporting any or all of the preceding interfaces.

One or more processors 206 can perform several functions, including communicating to a host computer device via electrical connector 204 and controlling functionality of wireless transceiver 210, memory 212, and/or input element 214. The one or more processors can include application-specific integrated circuits (ASICs), digital signal processors (DSPs), digital signal processing devices (DSPDs), programmable logic devices (PLDs), field-programmable gate arrays (FPGAs), serial or parallel processors, controllers, microcontrollers, and/or microprocessors. In certain embodiments, one or more processors 206 can include fixed-function video encoding hardware 208 that can be used to efficiently encode or decode video data received from or transmitted to a host computer device. For example, fixed-function encoding hardware 208 can include Moving Picture Experts Group (MPEG) encoding hardware for H.264, H.265, or other compression codecs.

As further disclosed herein, one or more processors 206 can present wireless multimedia dongle 200 to a host computer as a plurality of device classes. Multiple ones of the device classes can provide access to the same functionality of wireless multimedia dongle 200 (e.g., to the ability of the dongle to receive and wirelessly stream multimedia data from a host computer device). An HID and CDC device class can both be exposed, for example, and be used by a host computer device to stream multimedia data via wireless transceiver 210.

One or more processors 206 may also present wireless multimedia dongle 100 as a mass storage device that enables a host computer coupled thereto to access memory 212. Memory 212 may be static memory, such as flash, and can be used to store drivers and/or other computer instructions that may be transferred to a host computer device via a mass storage device class interface. Alternatively, memory 212 may act to temporarily store multimedia data for transmission by wireless transceiver 210 (or received from wireless transceiver 210). Although not illustrated, wireless transceiver 210 or one or more processors 206 may include memory therein that may be static or dynamic memory. The memory can include firmware and/or storage buffers as needed to enable functionality of wireless multimedia dongle 200 disclosed herein.

Wireless transceiver 210 can use a variety of wireless protocols and/or antenna designs. For example, wireless transceiver 210 may use Wi-Fi, Bluetooth, proprietary, or other wireless transfer protocols that may support point-to-point and/or broadcast transmissions. Wireless transceiver 210 can include a variety of different configurations of antennas to support the wireless protocol(s) used.

Input element 214 can be a physical button, switch, knob, or other and may be used to change an operational mode of wireless multimedia dongle 200. For example, one or more processors 206 may be configured to sense when input element 214 has been actuated by a user to change an operational state of wireless multimedia dongle 200 from a receiver to a transmitter (or vice versa) as disclosed herein. One or more processors 206 may also change an operational state of wireless multimedia dongle 200 in response to receiving a command from software on a host device to which wireless multimedia dongle 200 is coupled. Although not illustrated, wireless multimedia dongle 200 may include one or more light sources or other indicia that can be used to indicate an operational state of wireless multimedia dongle 200 and/or security features, as disclosed herein.

Secure video transmission between dongles may be a concern to, for example, mitigate inadvertent multimedia transmissions to an eavesdropper and/or to a mistaken recipient. These features may also be useful to identify a matched pair or grouping of wireless multimedia dongles from a larger group of dongles. To mitigate this risk, wireless multimedia dongles disclosed herein can include features to aid in identification of a matched pair. For example, a matched pair can be matched at a factory (e.g., hardcoded to work as a transmitter/receiver pair). One of several different codes can be used to identify a matched pair. The code can be indicated to a user via a light source of a wireless multimedia dongle, for example. The light source may flash a coded pattern via variously timed light pulses and/or colors of light pulses output to the user. The user can then verify whether a pair of receivers shares the same code. The code may be output in response to actuation of input element 214, for example. Input element 214 can be used to input multiple commands to wireless multimedia dongle 200 depending on, for example, if it is tapped or if it is depressed for a predetermined longer time period.

Another example of a way to identify matched pairs or groups of dongles may be for the dongles to output (via electrical connector 204), to a host computer device, a symbol or code for identification. For example, a wireless multimedia dongle configured as a receiver may output video including an icon that may be unique to the matched pair/group. A wireless multimedia dongle may also provide a unique code or symbol to software running on a host device. The software on the host device may be enabled to change a grouping or pairing of wireless multimedia dongles. In certain embodiments, the changing in pairing may be performed remotely such that, for example, a user of a host computer device coupled to a transmitter-configured wireless multimedia dongle may select one or several receiver setup wireless multimedia dongle(s) to receive multimedia data from the transmitter-configured wireless multimedia dongle.

In certain embodiments, a single transmitter-configured wireless multimedia dongle may broadcast wireless data to a plurality of receiver setup wireless multimedia dongles. The pairing between transmitter and multiple receivers may be configured by a user operating software on a host device coupled to the wireless multimedia dongle(s).

In certain embodiments, security can be improved between pairing of wireless multimedia dongles by providing a side channel to enable pairing. For example, one or more wireless multimedia dongles may include a near-field communication (NFC) chip or similar that provides a relatively short-range wireless signal such that two or more wireless multimedia dongles can be paired when brought in proximity of one another. For example, a first wireless multimedia dongle that is coupled to a host computer device may be paired with other wireless multimedia dongles that are in close proximity. Note that the other wireless multimedia dongles may not need to be powered as their respective onboard NFC chips may respond to a carrier wave emitted from the first wireless multimedia dongle. In some embodiments, multiple wireless multimedia dongles may be coupled to the same host computer device, allowing for pairing of wireless multimedia dongles that are later used with separate host computer devices.

Wireless multimedia dongle 200 may be powered from external power solely provided via electrical connector 204. As disclosed herein, electrical connector 204 may be a USB connector which may provide power nominally at five volts with a current up to three amps. However, wireless multimedia dongle 200 may operate utilizing less current, even less than nine hundred milliamps or five hundred milliamps nominally. Wireless multimedia dongle 200 can be configured to operate, as disclosed herein, without additional regulation of voltage from a USB connector. Wireless multimedia dongle 200 may operate using less than five watts of power from a USB connector. Wireless multimedia dongle 200 may operate in one of several performance modes depending on a version, type, or configuration of electrical connector 204. For example, electrical connector 204 can be connected to different versions or configurations of USB ports, each possibly having different power supply or data throughput capabilities. Wireless multimedia dongle 200 may adjust its wireless transmission range, bandwidth capabilities, video resolution, framerate, etc. depending on the amount of available power and/or data throughput available via electrical connector 204. The capabilities of the port that electrical connector 204 is attached can be determined via interrogation or characterization by wireless multimedia dongle 200.

Figure 3:
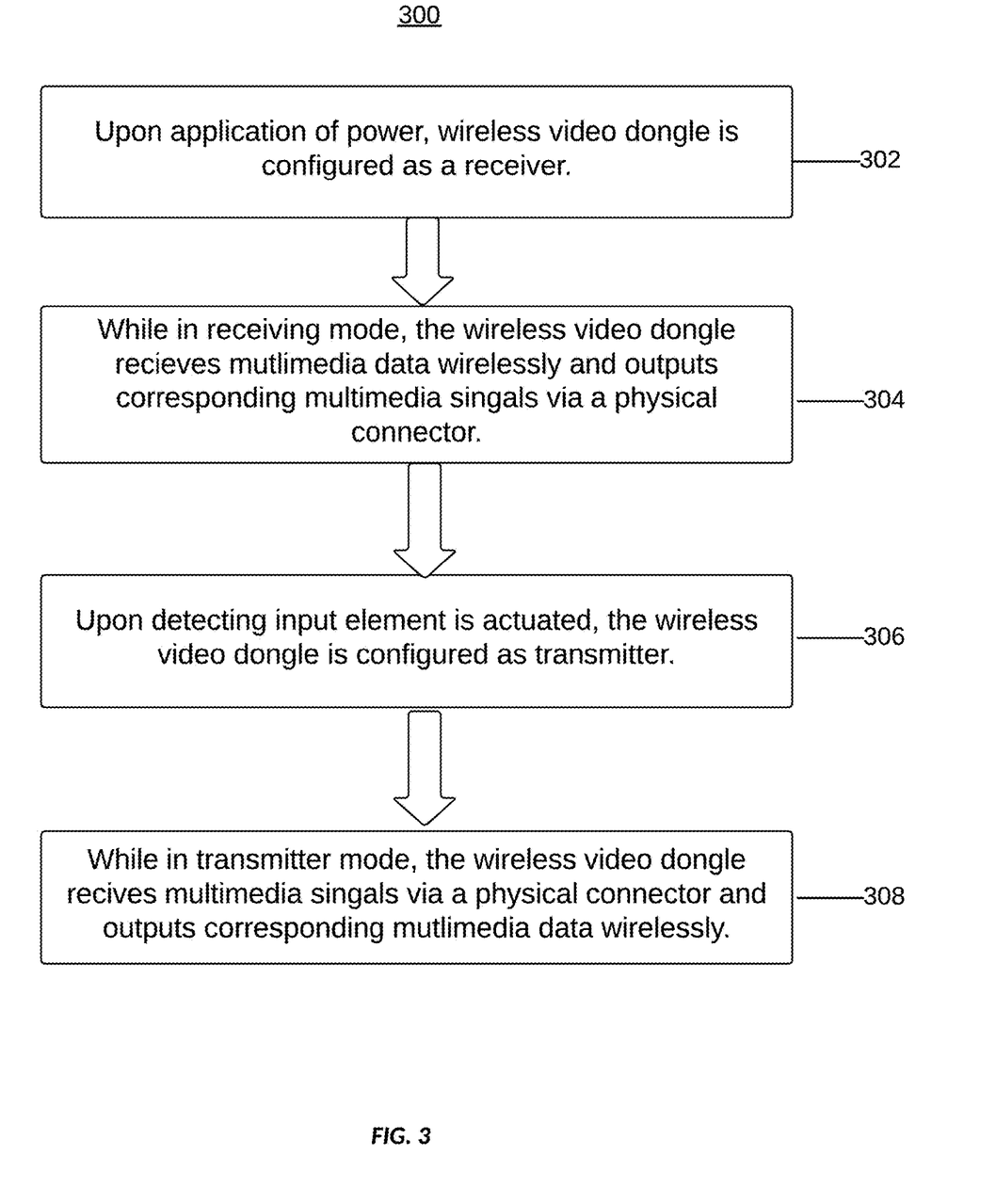
FIG. 3 shows an example flowchart illustrating various operating modes of a wireless multimedia dongle.

FIG. 3 illustrates a flowchart 300 for implementing certain techniques of the disclosure pertaining to using a signal configuration of a dongle alternately as a multimedia receiver or multimedia transmitter. At 302, a wireless multimedia dongle (such as dongle 100, 101, or 200) can receive power. As disclosed herein, the power can be received from a host computer device via an electrical connector, such as a USB connector. Upon activation of power, the wireless multimedia dongle can be configured to operate in a receiving mode, as described with regards to dongle 101.

At 304, the wireless multimedia dongle can operate in the receiving mode wherein multimedia data can be received wirelessly from a like wireless multimedia dongle configured as a multimedia transmitter, for example. The like wireless multimedia dongle can be paired from a factory or otherwise paired, as disclosed herein. Also, while in the multimedia receiving mode, the wireless multimedia dongle can output multimedia signal(s) via an electrical connector (such as electrical connector 204) to a host computer device.

At 306, the wireless multimedia dongle can detect that an input element is actuated (such as input element 214). The input element can be a physical button, switch, knob, etc., as disclosed herein, coupled to a housing of the wireless multimedia dongle. Upon actuation of the input element, the wireless multimedia dongle may transition from the multimedia receiving mode to a multimedia transmitting mode.

At 308, while the wireless multimedia dongle is in the multimedia transmitter mode, the wireless multimedia dongle may receive multimedia signals from a host computer device via an electrical connector (such as electrical connector 204). In response to receiving the multimedia signals, wireless multimedia data corresponding to the multimedia signals can be transmitted via a wireless transceiver (such as wireless transceiver 210). The wireless multimedia dongle may be transitioned back to the multimedia receiving mode upon another actuation of the input element or by cycling power to the wireless multimedia dongle (e.g., disconnecting and reconnecting the wireless multimedia dongle to a host computer device). However, in certain embodiments, the wireless multimedia dongle may maintain its state regardless of whether power has been removed from the dongle. In this manner a single wireless multimedia dongle can operate selectively as a multimedia transmitter or receiver.

Figure 4:
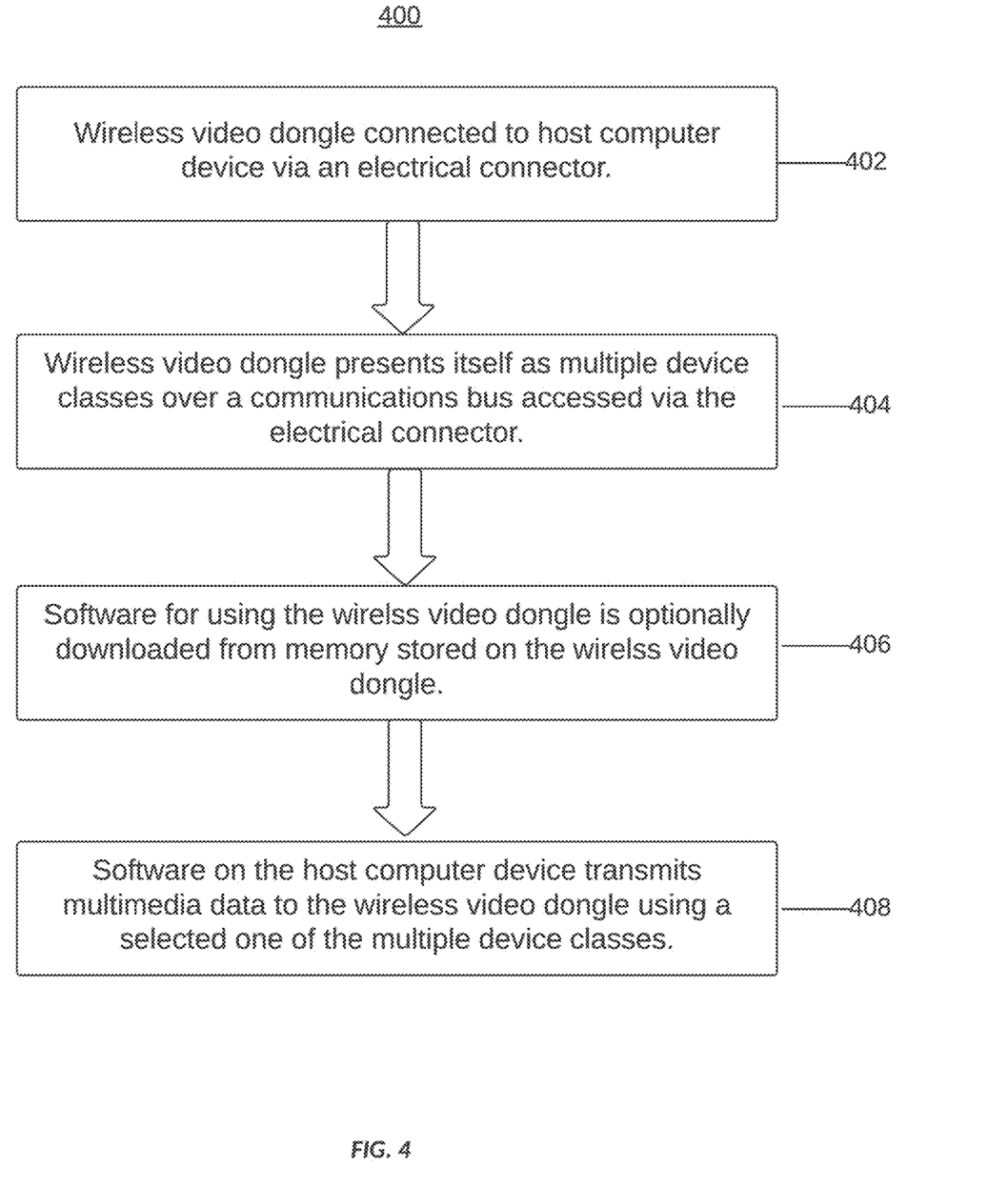
FIG. 4 shows an example flowchart illustrating various features to increase the flexibility of use of a wireless multimedia dongle.

FIG. 4 illustrates a flowchart 400 illustrating certain features of a wireless multimedia dongle (such as wireless multimedia dongles 100, 101, or 200) to provide enhanced cross-platform compatibility and thus flexibility. At 402, a wireless multimedia dongle can be coupled to a host computer device via an electrical connector (such as electrical connector 204). The electrical connector can be a USB connector, for example. The wireless multimedia dongle may be powered by the host computer device via the electrical connector.

At 404, the wireless multimedia dongle can communicate to the host computer device using the electrical connector. For example, the host computer device may interrogate the wireless multimedia dongle to determine its capabilities. The wireless multimedia dongle can present itself to the host computer device as multiple device classes (e.g., a single device that provides multiple functions and/or the same function accessible via different device classes). For example, the wireless multimedia dongle can include memory accessible via mass storage device class or wireless multimedia transmission/reception functions accessible via a communications/ethernet device class or an HID device class.

At 406, software can optionally be downloaded to the host computer device from the memory and via the mass storage device class. Certain host computer devices may have operating systems or security functions that prevent mass storage device classes from being used. In these instances, software for accessing functionality of the wireless multimedia dongle can otherwise be downloaded onto the host computer device, such as via an app store or via a network connection.

At 408, software loaded onto the host computer device can be used to transmit multimedia data to the wireless multimedia dongle. As disclosed herein, the multimedia data can include video and/or audio data in a variety of different formats. For example, the video or audio data can be transferred in a digital or analog format and may use several different compression technique(s)/codec(s). The multimedia data can then be transmitted, via a wireless transceiver, to a like wireless multimedia dongle set up as a multimedia receiver.

The multimedia data can be transmitted to the wireless multimedia dongle using one of the device classes presented to the host computer device at 404. The following different device classes are contemplated:

HID device class—A device class that enables multimedia data (video and/or audio data) to be transmitted in a streaming format to the wireless multimedia dongle. The HID device class can provide the least latency and processing overhead between device classes, but may not be supported by all host computer devices.

Mass storage device class—A device class that supports transfer of data in a non-streaming format (e.g., as files or chunks of data). The mass storage device class may be used to transfer multimedia data between a host computer device and a wireless multimedia dongle, but may incur latency penalties due to the non-streaming format of the data transferred from or to the host computer device. Additionally, some host computer devices may not support this device class.

Communications/ethernet device class—A device class that supports data transfer in an encapsulated format (e.g., via an internal protocol). These device classes are more universally supported by host computer devices but may have latency penalties, and many host computer devices may allow only one such device class to be active at any one time (thus, activating this device class via a wireless multimedia dongle may cause other communication devices to cease functioning).

The host computer device can select one of these device classes to use for transmitting multimedia data to a wireless multimedia dongle. The selection can be based on a corresponding software package installed onto the host computer device and/or upon an analysis of the capabilities of the host computer device. For example, security settings of the host computer device may be analyzed to determine its capabilities and/or data may be attempted to be transferred using a device class to see whether it is enabled on the host computer device.

Figure 5:
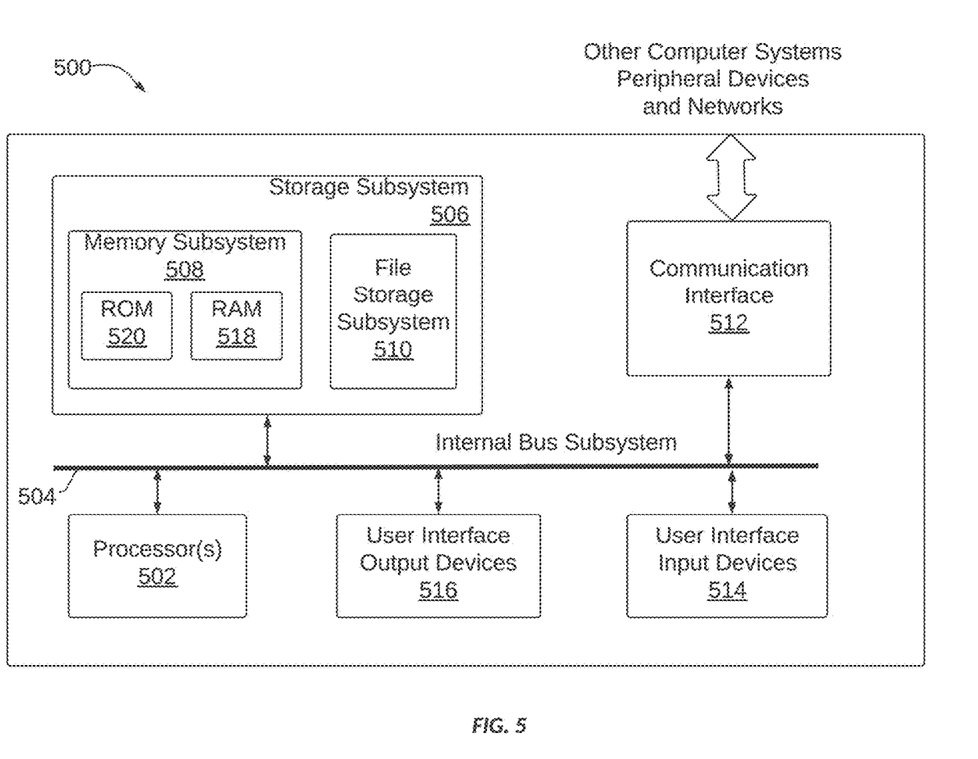
FIG. 5 depicts a block diagram of an embodiment of a computer system.

FIG. 5 is a simplified block diagram of a computer device 500. Computer device 500 can be an example of a wireless multimedia dongle or a host computer device. Computer device 500 can implement some or all functions, behaviors, and/or capabilities described above that would use electronic storage or processing, as well as other functions, behaviors, or capabilities not expressly described. Computer device 500 includes a processing subsystem ("processor(s)") 502, a storage subsystem 506, a user interface input devices 514, user interface output devices 516, and/or a communication interface 512. Computer device 500 can also include other components (not explicitly shown), such as a battery, power controllers, and other components, operable to provide various enhanced capabilities. In various embodiments, computer device 500 can be implemented on a desktop or laptop computer, mobile device (e.g., tablet computer, smartphone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units designed to perform a function or combination of functions described above.

Storage subsystem 504 can be implemented using a local storage and/or removable storage medium, e.g., using disk, flash memory (e.g., secure digital card, universal serial bus flash drive), or any other non-transitory storage medium, or a combination of media, and can include volatile and/or nonvolatile storage media. Local storage can include random access memory (RAM), including dynamic RAM (DRAM), static RAM (SRAM), or battery backed up RAM. In some embodiments, storage subsystem 504 can store one or more applications and/or operating system programs to be executed by processing subsystem 502, including programs to implement some or all operations described above that would be performed using a computer. For example, storage subsystem 504 can store one or more code modules (e.g., embodied in part or in whole by file storage subsystem 510) for implementing one or more method steps described above.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory, number of memories, or type of media upon which memory is stored.

Moreover, the terms "storage medium" or "storage device" may represent one or more memories for storing data, including read only memory (ROM), RAM, magnetic RAM, core memory, magnetic disk storage mediums, optical storage mediums, flash memory devices, and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means, including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, microcontrollers, microprocessors, other electronic units designed to perform the functions described above, and/or a combination thereof.

Each code module may comprise sets of instructions (codes) embodied on a computer-readable medium that directs a processor of a computer device 500 to perform corresponding actions. The instructions may be configured to run in sequential order, in parallel (such as under different processing threads), or in a combination thereof. After loading a code module on a general-purpose computer system, the general-purpose computer is transformed into a special-purpose computer system.

Computer programs incorporating various features described herein (e.g., in one or more code modules) may be encoded and stored on various computer-readable storage media. Computer-readable media encoded with the program code may be packaged with a compatible electronic device, or the program code may be provided separately from electronic devices (e.g., via Internet download or as a separately packaged computer-readable storage medium). Storage subsystem 506 can also store information useful for establishing network connections using the communication interface 512.

User interface input devices 514 can include input devices such as a touch pad, touch screen, scroll wheel, click wheel, dial, button, switch, keypad, microphone, etc., together with supporting electronics (e.g., digital-to-analog or analog-to-digital converters, signal processors, etc.). User interface output devices 516 can include a video screen, indicator lights, speakers, headphone jacks, virtual- or augmented-reality display, etc., together with supporting electronics. A user can operate input devices of user interface input devices 514 and/or user interface output devices 516 to invoke the functionality of computer device 500 and can view and/or hear output from computer device 500 via output devices of user interface 506. For some embodiments, the user interface(s) 514, 516 might not be present (e.g., for a process using an ASIC).

Processing subsystem 502 can be implemented as one or more processors (e.g., integrated circuits, one or more single-core or multi-core microprocessors, microcontrollers, central processing unit, graphics processing unit, etc.). In operation, processing subsystem 502 can control the operation of computer device 500. In some embodiments, processing subsystem 502 can execute a variety of programs in response to program code and can maintain multiple concurrently executing programs or processes. At a given time, some or all of a program code to be executed can reside in processing subsystem 502 and/or in storage media, such as storage subsystem 506. Through programming, processing subsystem 502 can provide various functionality for computer device 500. Processing subsystem 502 can also execute other programs to control other functions of computer device 500, including programs that may be stored in storage subsystem 506.

Communication interface 512 can provide voice and/or data communication capability for computer device 500. In some embodiments, communication interface 512 can include radio frequency (RF) transceiver components for accessing wireless data networks (e.g., Wi-Fi network, 3G, 4G/LTE; etc.), mobile communication technologies, components for short-range wireless communication (e.g., using Bluetooth communication standards, NFC, etc.), other components, or combinations of technologies. In some embodiments, communication interface 512 can provide wired connectivity (e.g., universal serial bus, Ethernet, universal asynchronous receiver/transmitter, etc.) in addition to, or in lieu of, a wireless interface. Communication interface 512 can be implemented using a combination of hardware (e.g., driver circuits, antennas, modulators/demodulators, encoders/decoders, and other analog and/or digital signal processing circuits) and software components. In some embodiments, communication interface 512 can support multiple communication channels concurrently. In some embodiments, the communication interface 512 is not used.

It will be appreciated that computer device 500 is illustrative and that variations and modifications are possible. A computer device can have various functionality not specifically described (e.g., voice communication via cellular telephone networks) and can include components appropriate to such functionality.

Further, while the computer device 500 is described with reference to particular blocks, it is to be understood that these blocks are defined for convenience of description and are not intended to imply a particular physical arrangement of component parts. For example, the processing subsystem 502, the storage subsystem, the user interfaces 514, 516, and/or the communication interface 512 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus, including electronic devices implemented using a combination of circuitry and software. Electronic devices described herein can be implemented using computer device 500.

Various features described herein, e.g., methods, apparatus, computer-readable media, and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but it could have additional steps not included in the figure. A process may correspond to a method, a function, a procedure, a subroutine, a subprogram, etc.

A recitation of "a," "an," or "the" is intended to mean "one or more" unless specifically indicated to the contrary. Patents, patent applications, publications, and descriptions mentioned here are incorporated by reference in their entirety for all purposes. None is admitted to be prior art.

Additional embodiments of the disclosure can include:
1. A wireless multimedia dongle comprising:
a housing;
an electrical connector coupled to the housing;
a wireless transceiver coupled to the housing; and
one or more processors coupled to the wireless transceiver, the one or more processors configured to operate the wireless multimedia dongle as:
    a transmitter configured to transmit, via the wireless transceiver, video data received via the electrical connector; and a receiver configured to receive, via the wireless transceiver, video data from a like dongle and output the video data via the electrical connector.
2. The wireless multimedia dongle of claim 1, wherein the one or more processors are configured to, upon application of power, configure the transceiver to operate as the receiver.
3. The wireless multimedia dongle of any of the previous recitations wherein the wireless multimedia dongle further comprises a physical input element and the one or more processors are configured to selectively configure the dongle as either the transmitter or receiver in response to actuation of the physical input element.
4. The wireless multimedia dongle of any of the previous recitations wherein the wireless multimedia dongle includes a light emitter that changes state to indicate whether the wireless multimedia dongle is configured as the receiver or as the transmitter.
5. The wireless multimedia dongle of any of the previous recitations wherein the one or more processors are configured to reformat the video data between a format for output or reception via the electrical connector and a format for transmittal or receival via the wireless transceiver.
6. The wireless multimedia dongle of any of the previous recitations wherein, while configured to act as the transmitter, the one or more processors are configured to transmit, via the wireless transceiver, to a plurality of like wireless multimedia dongles contemporaneously.
7. The wireless multimedia dongle of any of the previous recitations wherein, while the wireless multimedia dongle is configured as a receiver, the one or more processors are configured to output, via the electrical connector, an image indicating an identity of a coupled like wireless multimedia dongle configured as a transmitter.
8. The wireless multimedia dongle of any of the previous recitations wherein, while the wireless multimedia dongle is configured as a transmitter, the one or more processors are configured to output, via the electrical connector, data indicating an identity of a coupled like wireless multimedia dongle configured as a receiver.
9. The wireless multimedia dongle of any of the previous recitations wherein the electrical connector can be selectively chosen as a universal serial bus connector or a high-definition media interface connector.
10. The wireless multimedia dongle of any of the previous recitations wherein, while the wireless multimedia dongle is configured as a transmitter, the one or more processors are configured to communicate with a host device that the wireless multimedia dongle is coupled to via the electrical connector to modify one or more parameters of the streaming video.

Additional embodiments of the disclosure can also include:
1. A wireless multimedia dongle comprising:
  a housing;
  an electrical connector coupled to the housing, the electrical connector including data and power electrical paths;
  a wireless transceiver coupled to the housing; and
  one or more processors coupled to the wireless transceiver, the one or more processors configured to either transmit or receive video data via the wireless transceiver and respectively input or output video signals via the electrical connector; and
  wherein the wireless multimedia dongle is powered via the electrical connector.
2. The wireless multimedia dongle of any of the previous recitations wherein the electrical connector is the sole connector of the wireless multimedia dongle to receive external electrical power.
3. The wireless multimedia dongle of any of the previous recitations wherein the electrical connector is a Universal Serial Bus connector.
4. The wireless multimedia dongle of any of the previous recitations wherein the one or more processors include fixed-function hardware for encoding or decoding video data for wireless transmission via the wireless transceiver.
5. The wireless multimedia dongle of any of the previous recitations wherein the wireless multimedia dongle is configured to be powered by power input via the power electrical paths at a steady state voltage of less than six volts.
6. The wireless multimedia dongle of any of the previous recitations wherein the wireless multimedia dongle is configured to be powered by less than five watts of power input via the power electrical paths at a steady state.
7. The wireless multimedia dongle of any of the previous recitations wherein, upon application of power to the wireless multimedia dongle via the electrical connector, the one or more processors configure the wireless multimedia dongle to receive the video data via the wireless transceiver and output the video signals via the electrical connector.
8. The wireless multimedia dongle of any of the previous recitations wherein the one or more processors are configured to be powered in one or more performance modes depending on the amount of power received via the electrical connector.
9. The wireless multimedia dongle of any of the previous recitations wherein video signals are in the same format regardless of whether the wireless multimedia dongle is outputting or receiving the video signals.
10. The wireless multimedia dongle of any of the previous recitations further comprising an electrical power reserve used to power the wireless multimedia dongle for short periods wherein the steady-state power draw from the electrical connector is insufficient.

What is claimed is:
1. A wireless multimedia dongle system, comprising:
  a host computer device including:
    a Universal Serial Bus (USB) electrical port; and
    one or more host processors coupled to the USB electrical port; and
  a wireless multimedia dongle including:
    a housing;
    a USB electrical connector coupled to the housing;
    a memory coupled to the housing;
    a wireless transceiver coupled to the housing; and
    one or more dongle processors coupled to the wireless transceiver, the housing, and the memory, the one or more dongle processors configured to:
      operate the wireless multimedia dongle as a transmitter, wherein, while in the transmitter mode, the wireless multimedia dongle is configured to transmit, via the wireless transceiver, transmitter video data input via the USB electrical connector from the host computer device;
      operate the wireless multimedia dongle as a receiver, wherein, while in the receiver mode, the wireless multimedia dongle is configured to receive, via the wireless transceiver, receiver video data from a like wireless multimedia dongle and output the video data via the USB electrical connector to the host computer device;

detect that the USB electrical connector has been attached to the USB electrical port of the host computer device;

in response to detecting that the USB electrical connector has been attached to the USB electrical port, present the wireless multimedia dongle as a plurality of USB-compliant device classes including an ethernet device class and a human interface device (HID) class, wherein each of the ethernet device class and the HID device is capable of receiving the transmitter video data for wireless transmission;

receive the transmitter video data via the USB electrical connector as ethernet-encoded data, via the ethernet device class, from the host computer; and wherein the one or more host processors are configured to output the transmitter video data via the USB electrical port as ethernet-encoded data.

2. The wireless multimedia dongle system of claim 1, wherein the one or more dongle processors are configured to output the receiver video data via the USB electrical connector as ethernet-encoded data from the host computer; and the one or more host processors are configured to output the transmitter video data via the USB electrical port as ethernet-encoded data.

3. The wireless multimedia dongle system of claim 1, wherein the one or more processors are configured to output an indicium shared with a paired like wireless multimedia dongle.

4. A computer dongle, comprising:
a housing;
an electrical connector coupled to the housing;
a function-specific circuit coupled to the housing; and
one or more processors coupled to the function-specific circuit and the housing, the one or more processors configured to:
 receive data, from a host computer device via the electrical connector, in any one of a plurality of formats, including an ethernet-encoded format, wherein the format is based on an operating system (OS) running on the host computer device;
 pass the data to the function-specific circuit wherein the data is used by the function-specific circuit to enable a function for the host computer device provided by the computer dongle; and
 provide the same function to the host computer device in response to receiving the data encoded in the ethernet format.

5. The computer dongle of claim 4, wherein the one or more processors are configured to de-encapsulate the ethernet-encoded data prior to passing the data to the function-specific circuit.

6. A computer dongle, comprising:
a housing;
an electrical connector coupled to the housing;
a function-specific circuit coupled to the housing; and
one or more processors coupled to the function-specific circuit and the housing, the one or more processors configured to:
 receive data, from a host computer device via the electrical connector, in any one of a plurality of formats, including an ethernet-encoded format, wherein the format is based on an operating system (OS) running on the host computer device;
 pass the data to the function-specific circuit wherein the data is used by the function-specific circuit to enable a function for the host computer device provided by the computer dongle; and
 provide the same function to the host computer device in response to receiving the data encoded in the format based on the operating system (OS) running on the host computer device
wherein the one or more processors are configured to present the computer dongle to the host computer as a plurality of device classes wherein the data is received by the computer dongle in the ethernet-encoded format or the non-ethernet-encoded format via a respective different one of the plurality of device classes.

7. The computer dongle of claim 6, wherein the one or more processors are configured to receive tertiary data via the electrical connector via a tertiary one of the plurality of device classes; and
wherein the tertiary data is used to enable the function for the host computer device.

8. The computer dongle of claim 4, wherein the ethernet-encoded data includes video data and the function is to wirelessly transmit or receive the video data with a like computer dongle.

9. The computer dongle of claim 6, further comprising non-transitory memory storing instructions, wherein:
the memory is accessible by the host computer device via the electrical connector and via an additional one of the plurality of device classes; and
wherein the instructions, when read by the host computer, configure the host computer to access the function of the dongle.

10. The computer dongle of claim 4, wherein the function-specific circuit includes a wireless transceiver.

11. The computer dongle of claim 10, wherein the function-specific circuit includes fixed-function hardware configured to encode or decode video data.

12. A method of operating a computer dongle, comprising:
receiving data, at the computer dongle via an electrical connector coupled to the computer dongle, from a host computer device, in any one of a plurality of formats including an ethernet-encoded format, wherein the format is based on an operating system running on the host computer device;
passing the data to a function-specific circuit of the computer dongle, wherein the data is used by the function-specific circuit to enable a function for the host computer device provided by the computer dongle; and
wherein the same function is provided to the host computer device in response to receiving the data encoded in the ethernet format.

13. The method of operating a computer dongle of claim 12, further comprising de-encapsulating the ethernet-encoded data prior to passing the data to the function-specific circuit.

14. A method of operating a computer dongle, comprising:
receiving data, at the computer dongle via an electrical connector coupled to the computer dongle, from a host computer device, in any one of a plurality of formats including an ethernet-encoded format, wherein the format is based on an operating system running on the host computer device;
passing the data to a function-specific circuit of the computer dongle, wherein the data is used by the function-specific circuit to enable a function for the host computer device provided by the computer dongle; and wherein the same function is provided to the host computer device in response to receiving the data encoded in the format based on the operating system running on the host computer device further comprising presenting the computer dongle to the host computer as a plurality of device classes wherein the data is received by the computer dongle in the ethernet-encoded format or the non-ethernet-encoded format via a respective different one of the plurality of device classes.

15. The method of operating a computer dongle of claim 14, further comprising receiving tertiary data via the electrical connector via a tertiary one of the plurality of device classes; and wherein the tertiary data is used to enable the function for the host computer device.

16. The method of operating a computer dongle of claim 12, wherein the ethernet-encoded data includes video data and the function is to wirelessly transmit or receive the video data with a like computer dongle.

17. The method of operating a computer dongle of claim 14, further comprising:

transmitting, via the electrical connector and via an additional one of the plurality of device classes, from non-transitory memory of the computer dongle, instructions to the host computer device via the electrical connector and via an additional one of the plurality of device classes; and wherein the instructions, when read by the host computer, configure the host computer to access the function of the dongle.

18. The method of operating a computer dongle of claim 12, wherein the function-specific circuit includes a wireless transceiver.

19. The method of operating a computer dongle of claim 18, wherein the function-specific circuit includes fixed-function hardware configured to encode or decode video data.

20. The method of operating a computer dongle of claim 18, further comprising detecting that the data received via the electrical connector is in a raw format and, in response, encoding the data prior to wireless transmission via the wireless transceiver.

* * * * *